US012561199B2

(12) United States Patent
Hinkle et al.

(10) Patent No.: US 12,561,199 B2
(45) Date of Patent: Feb. 24, 2026

(54) APPARATUS WITH CHAINED STORAGE MANAGEMENT MECHANISM AND METHODS FOR OPERATING THE SAME

(71) Applicant: Micron Technology, Inc., Boise, ID (US)

(72) Inventors: Jonathan R. Hinkle, Raleigh, NC (US); Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/641,290

(22) Filed: Apr. 19, 2024

(65) Prior Publication Data

US 2024/0378111 A1     Nov. 14, 2024

Related U.S. Application Data

(60) Provisional application No. 63/464,898, filed on May 8, 2023.

(51) Int. Cl.
*G06F 11/10*          (2006.01)

(52) U.S. Cl.
CPC ........ *G06F 11/1004* (2013.01); *G06F 11/108* (2013.01)

(58) Field of Classification Search
CPC ............. G06F 11/1004; G06F 11/1048; G06F 11/108; G06F 11/1088; G06F 11/1092
See application file for complete search history.

(56) References Cited

U.S. PATENT DOCUMENTS

| | | | | |
|---|---|---|---|---|
| 6,058,464 A * | 5/2000 | Taylor | ..................... | G06F 13/42 |
| | | | | 711/219 |
| 2004/0068620 A1* | 4/2004 | Van Doren | ......... | G06F 12/0804 |
| | | | | 711/E12.04 |
| 2005/0114467 A1* | 5/2005 | Ikegaya | .............. | G06F 11/3006 |
| | | | | 709/217 |
| 2007/0011361 A1* | 1/2007 | Okada | ................... | G06F 3/0656 |
| | | | | 710/8 |
| 2012/0089854 A1* | 4/2012 | Breakstone | ......... | G06F 13/4022 |
| | | | | 713/323 |
| 2020/0133896 A1* | 4/2020 | Marks | ...................... | G06F 13/24 |
| 2022/0137835 A1* | 5/2022 | Malakapalli | ........ | G06F 9/30029 |
| | | | | 714/6.22 |
| 2023/0105531 A1* | 4/2023 | Mears | ................. | H04L 67/1036 |
| | | | | 709/203 |

OTHER PUBLICATIONS

U.S. Appl. No. 18/641,286—Unpublished Patent Application to Jonathan Hinkle et al., filed Apr. 19, 2024, titled "Apparatus With Storage Connection Mechanism and Methods for Operating the Same", 28 pages.
U.S. Appl. No. 18/641,296—Unpublished Patent Application to Jonathan Hinkle et al., filed Apr. 19, 2024, titled "Apparatus With Multi-Host Storage Connection Mechanism and Methods for Operating the Same", 37 pages.

* cited by examiner

*Primary Examiner* — Robert W Beausoliel, Jr.
(74) *Attorney, Agent, or Firm* — Dorsey & Whitney LLP

(57) ABSTRACT

Methods, apparatuses, and systems related to serially chained memory subsystems are described. The grouped set of chained subsystems may coordinate internal communications and operations across the separate subsystems within the set. Memory locations for related or connected data may be dynamically computed to be across multiple subsystems to allow for parallel processing, failure/error recovery, or the like.

20 Claims, 4 Drawing Sheets

400

INITIALIZE GROUP SET 402

IDENTIFY DATA DISTRIBUTION MECHANISM AT DESIGNATED DRIVE 412

IDENTIFY LOCAL PROCESSING MECHANISM AT EACH DRIVE 414

TRACK DATA STORAGE STATUS 404

PERFORM MEMORY OPERATIONS 406

STORE DATA ACCORDING TO STATUS 422

PERFORM DATA MAINTENANCE OP 424

COORDINATE LOCAL PROCESS 432

COMBINE LOCAL RESULTS 434

APPARATUS WITH CHAINED STORAGE MANAGEMENT MECHANISM AND METHODS FOR OPERATING THE SAME

CROSS-REFERENCE TO RELATED APPLICATION(S)

The present application claims priority to U.S. Provisional Patent Application No. 63/464,898, filed May 8, 2023, the disclosure of which is incorporated herein by reference in its entirety.

This application contains subject matter related to U.S. patent application Ser. No. 18/641,286, by Jonathan R. Hinkle et al., filed Apr. 19, 2024, titled "APPARATUS WITH STORAGE CONNECTION MECHANISM AND METHODS FOR OPERATING THE SAME" and U.S. patent application Ser. No. 18/641,296, by Jonathan R. Hinkle et al., filed Apr. 19, 2024, titled "APPARATUS WITH MULTI-HOST STORAGE CONNECTION MECHANISM AND METHODS FOR OPERATING THE SAME." The related applications, of which the disclosures are incorporated by reference herein, are assigned to Micron Technology, Inc.

TECHNICAL FIELD

The disclosed embodiments relate to devices, and, in particular, to semiconductor memory devices with storage connection mechanisms and methods for operating the same.

BACKGROUND

The growth in computing and communication technologies is rapidly increasing the need to efficiently store and provide access to data. Such data storage is provided through memory systems that include memory devices, such as volatile memory devices, non-volatile memory devices (e.g., flash memory employing "NAND" technology or logic gates, "NOR" technology or logic gates, or a combination thereof), or a combination device.

The memory systems and/or the memory devices are connected to host devices (e.g., end-user computing device, host processors, or the like) through wired and/or wireless means. However, each connected device and system has limited communication capacities (e.g., limitations on maximum throughput, bandwidth, communication ports, communication channels, or the like) due to operating environment, cost, current state of the technologies, or other such factors. As such, the increasing demand for data storage typically corresponds to a demand for higher storage density for each memory device/system.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figures 1A, 1B:
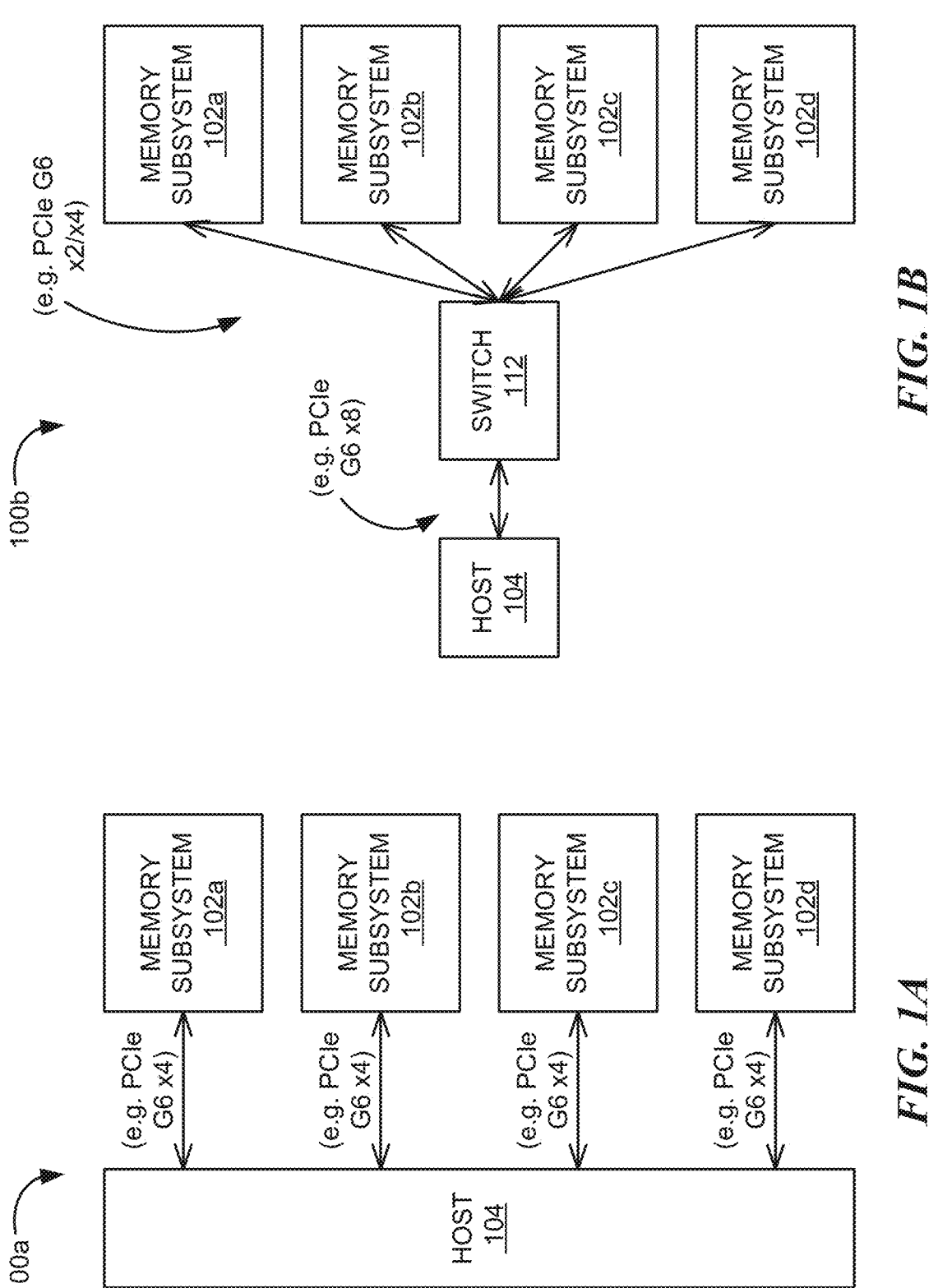
FIG. 1A and FIG. 1B are block diagrams illustrating connection schemes between a system host and memory subsystems in a computing system.

As described in greater detail below, the technology disclosed herein relates to an apparatus, such as memory systems, systems with memory devices, related methods, etc., for managing a set of grouped memory devices or subsystems. The grouped set of devices/subsystems can be connected in series. The grouped set can include an interfacing subsystem coupled to and directly communicating with a system host. The grouped set can include at least one chained subsystem serially connected to the interfacing subsystem. The one or more chained subsystems can be communicatively coupled to the system host through the interfacing subsystem and any preceding/serially connected subsystems.

The devices having direct communication can operate as communication endpoints. For the direct communication, any intervening circuits or devices (e.g., repeaters, routers, or the like) may perform (1) signal processing, such as for restoring the communicated waveforms, and/or (2) restorative data processing (e.g., error corrections) in forwarding or reconveying the communicated data without altering or directly utilizing the content of the communicated data.

In some embodiments, the grouped set can operate as a single system or unit with respect to the system host. In other words, the interfacing subsystem can present the grouped set of subsystems as a singular unit to the system host, and the system host can view the grouped set of subsystems as a single memory system/device and operate accordingly. In other embodiments, each individual subsystem/device within the grouping can be viewable to the system host. The system host can identify and directly communicate with each individual subsystem/device in the grouping. The preceding devices, including the interfacing subsystem, can provide the visibility and facilitate the direct communication.

For illustrative purposes, embodiments of the present technology are described below in the context of a server system using peripheral component interconnect express (PCIe) connections between the connected components. However, it is understood that the embodiments of the present technology can be implemented in other contexts or environments, such as in an end-point computing system, mainframes, or the like. Moreover, the embodiments of the present technology can be implemented using other communication connections, such as for wireless connections, other wired communication schemes, or the like.

The grouped set can manage the internal memory processes across the separate subsystems. In some embodiments, for example, the grouped set can divide and store a body of data across two or more subsystems, such as according to Redundant Array of Independent Disks (RAID) configurations. In dividing and storing the body of data, such as into memory blocks, the grouped set can divide ownership of related management duties, such as in processing error correction computation. The grouped set can manage the assignment of such ownership for related bodies and/or blocks of data such that the memory subsystems process the related information simultaneously in parallel.

Management of the grouped set can further include a management of the separately and locally maintained information. For example, one or more predetermined devices (e.g., the interfacing subsystem) can be configured to access locally managed logs from each subsystems and aggregate the access results to form a comprehensive log. The predetermined devices can utilize the aggregated log to operate the grouped set as a singular unit (e.g., one NVMe drive or one PCie endpoint device).

Additionally or alternatively, the grouped set can include management processes for responding to subsystem or drive failures. For example, each drive in the grouped set can include separate redrive or interface circuits configured to facilitate the serial communication independently of the status of the local storage array. Moreover, the grouped set can be configured to internally detect memory failures at one or more of the local storage arrays. In response to the detected failure, the grouped set can maintain the serial communication and further utilize remaining portions in the distributed unit of data to recover or regenerate the portion stored in the failed drive.

In some embodiments, the subsystems/drives in the grouped set can locally include a management circuit that includes a computational storage processor (CSP), a redundancy circuit, a redrive circuit, or a combination thereof. The management circuit can be configured to perform and implement the cross-subsystem management operations.

For comparative purposes, FIG. 1A and FIG. 1B are block diagrams illustrating connection schemes between a system host 104 (e.g., a system processor) and memory subsystems (e.g., memory subsystems 102a, 102b, 102c, and 102d) in a computing system (e.g., a server). Conventionally, the computing system include the system host 104 directly connected to each of the memory subsystems (e.g., memory drives, such as nonvolatile memory express (NVMe) solid-state drives (SSDs)). In other words, the memory subsystems 102a, 102b, 102c, and 102d are connected in parallel to the system host 104.

FIG. 1A illustrates a computing system 100a having a set of direct connections (e.g., without intervening devices) between the system host 104 and the parallel-connected memory subsystems 102a, 102b, 102c, and 102d. FIG. 1B illustrates a computing system 100b implementing the parallel connection through an intervening device 112 (e.g., a switch). The parallel configuration for the computing system 100b can also be called a fan-out configuration.

Referring to FIG. 1A and FIG. 1B together, the communicative connections between, the system host 104, the memory subsystems 102a, 102b, 102c, 102d, the intervening device 112, or a combination thereof can include PCIe connections. Each direct connection illustrated in FIG. 1A and FIG. 1B represents one or more lanes of PCIe G6 connections.

The connection speeds according to the number of lanes (e.g., bus width) and connecting technologies. For PCIe Generation 4.0 connections, the PCIe connection between the devices commonly include four lanes. Typically, the four-channel connection provides a maximum bandwidth performance for data transfers of about 6.4 GB/s. Later revisions of the PCIe interface may enable higher maximum bandwidth performance for four lanes, such as with PCIe Gen5 providing up to 12.8 GB/s and up to 25.6 GB/s for PCIe Gen6. Same bandwidth may be achievable with fewer lanes or smaller bus width, such as for a single lane PCIe Gen6 providing approximately 6.4 GB/s, and two lanes of PCIe Gen6 providing about 12.8 GB/s.

In contrast to the growth in the communication capacities, storage devices (e.g., NAND Flash based NVMe SSD) performance is currently failing to scale at a similar rate. As such, the currently available storage devices fail to provide the capacity/density that can fully utilize the communication capacities. Also, for highest capacity SSDs used for bulk storage capacity and for replacing some Hard Disk Drives (HDD), the performance needs are much smaller. Such devices typically require half to ⅛ of the available bandwidth per drive.

In some designs, running at higher interface speeds may reduce interconnect cost by requiring less expensive cables and routing in a system. For example, it may be more cost effective to run a two-lane (×2) PCIe Gen6 connection to each drive instead of a four-lane (×4) PCIe Gen5 connection, but it can provide the system with approximately the same bandwidth. However, the reduction in cable cost and connection complexity often requires the use of the switch 112 with additional power requirements and other related costs.

Example Topology

Figures 2, 3:
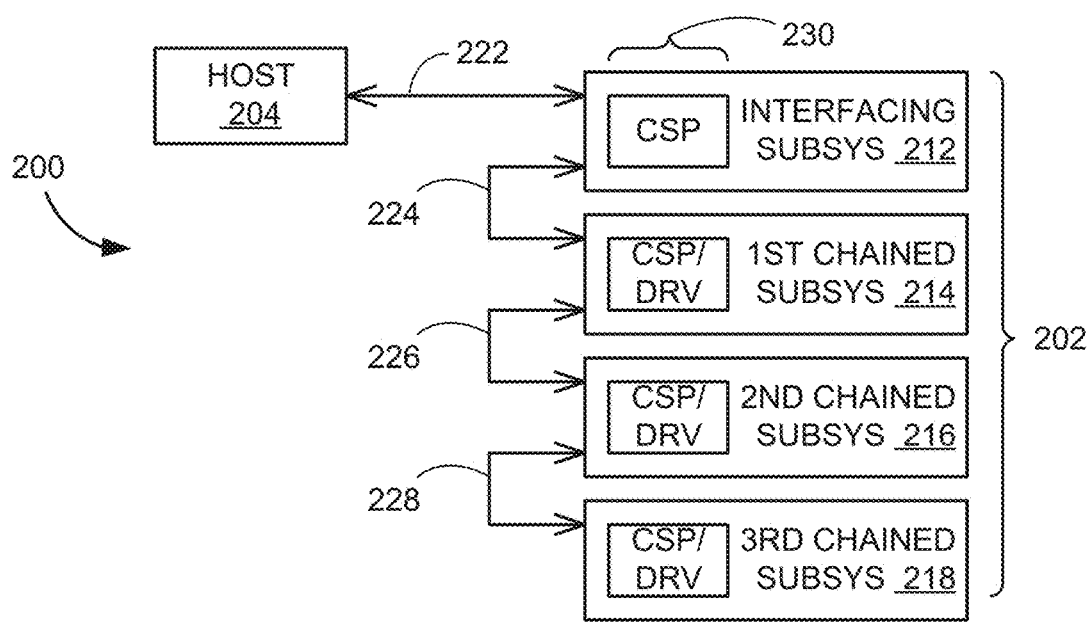
FIG. 2 is a block diagram of a computing system with chained memory subsystems in accordance with an embodiment of the present technology.
FIG. 3 is a block diagram of a memory subsystem in accordance with an embodiment of the present technology.

In contrast to the conventional systems, FIG. 2 illustrates a block diagram of a computing system 200 with chained memory subsystems in accordance with an embodiment of the present technology. The computing system 100 can include a personal computing device/system, an enterprise system, a mobile device, a server system, a database system, a distributed computing system, or the like. The computing system 200 can include a system host 204 (e.g., the system host 104 of FIG. 1A/1B, such as a server CPU) connected to a serially linked grouping of memory subsystems 202 (also referred to as a "grouped set 202"). The system host 204 can include one or more processors that can write data to and/or read data from the grouped set 202 (e.g., the memory locations therein). For example, the system host 204 can include an upstream central processing unit (CPU).

The grouped set 202 can include multiple memory subsystems (e.g., storage drives, such as NVMe SSDs) that are serially connected to each other and the system host 204. For example, the grouped set 202 can include (1) an interfacing subsystem 212 that is directly connected to and/or directly communicating with the system host 204 through a host-memory connection 222 and (2) a first chained subsystem 214 that is directly connected to the interfacing subsystem 212 through a first memory-internal connection 224. The first chained subsystem 214 can be communicatively coupled to the system host 204 through the interfacing subsystem 212 over the host-memory connection 222 and the first memory-internal connection 224. In other words, the first chained subsystem 214 and the system host 204 may be without any direct communicative paths (e.g., without other potential endpoint devices) that link the devices as communication endpoints.

The grouped set 202 can include additional subsystems, such as a second chained subsystem 216, a third chained subsystem 218, and so forth, that follow the cascading topology. For example, according to the serial connection configuration, the second chained subsystem 216 can be directly connected to the first chained subsystem 216 through a second memory-internal connection 226, and the third chained subsystem 218 can be directly connected to the second chained subsystem 216 through a third memory-internal connection 228. In other words, the chained subsystems 214-218 can be configured to leverage the serial connections and communicate through the interfacing subsystem 212 in communicating with the system host 204 instead of directly communicating with the system host 204. To facilitate the communication with the chained subsystems, the interfacing subsystem 212 can logically and/or physically present the chained subsystems or the memory locations therein through the host-memory connection 222.

For illustrative purposes, the grouped set 202 is shown having up to four separate subsystems. However, it is understood that the grouped set 202 can include a greater number of (e.g., five or more) chained subsystems. The number of chained subsystems can vary according to a balance between targeted performance and capacity.

Each of the connections 222-228 can correspond to PCIe or other types of high-speed input-output connections. For example, the connections 222-228 can implement various generations of PCIe (e.g., Gen4, Gen5, Gen6, or greater) and include one or more lanes within each connection. The host-memory connection 222 can have a capacity (e.g., a throughput rate, a number of lanes, or the like) that is equivalent to or greater than the memory-internal connections 224-228.

In comparison to the connections illustrated in FIG. 1A, the host-memory connection 222 can be paired to a higher storage capacity. In other words, each PCIe connection/port at the system host 204 can be connected to greater storage capacities (e.g., two or more drives) than the connections/ports at the system host 104 of FIG. 1A. In comparison to the connections between the subsystems and the switch 112 illustrated in FIG. 1B, the memory-internal connections 224-228 can have equivalent or reduced capacities (e.g., earlier generation technology and/or reduced number of lanes). In some embodiments, the memory-internal connections 224-228 can have lanes that are dedicated to each subsystem, and thusly successively decreasing in the number of lanes in moving away from the interfacing subsystem 212. For the example with the grouped set 202 including four subsystems, the first memory-internal connection 224 can include 3n lanes (e.g., 3 lanes), the second memory-internal connection 226 can include a set of 2n lanes (e.g., 1n less than the first memory-internal connection 224, such as 2 lanes), and the third memory-internal connection 228 can include n lanes.

Accordingly, the serial connections and the cascaded configuration in the grouped set 202 can allow significant reduction of interconnect required for the host per the number of drives attached while preserving the bandwidth needed per drive, thereby leveraging the faster communication interfaces. The serial connections and the cascaded configuration in the grouped set 202 can also reduce or eliminate the need for intermediate PCIe switches which add significant cost and power to the overall computing system.

In some embodiments, the interfacing subsystem 212 can include a NVMe drive controller (e.g., a processors and/or a chained controller mechanism, described in further detail below, such as for the interfacing subsystem) having (1) a plurality of one or more lanes connected to the system host 204 and (2) a plurality of one or more lanes to a peer drive (e.g., the first chained subsystem 214). The NVMe drive controller can have or function as a PCIe root complex that hosts the subsequently chained drives. That interfacing subsystem 212 can then pass information for each of the subsequently chained drive below it to the upstream device(s) (e.g., the system host 204). The system host 204 can access the aggregate of storage devices in the chain based on the communication management function provided by the interfacing subsystem 212.

The grouped set 202 can operate as a single system or unit or as individual/separate units with respect to the system host 204. For example, the interfacing subsystem 212 can present the grouped set 202 as a singular unit to the system host 204, and the system host 204 can view the grouped set 202 a single memory system/device and operate accordingly. Effectively, the system host 204 can recognize the interfacing subsystem 212 as a representation of the grouped set 202 and view the subsequently chained subsystems or the storage locations therein logically (e.g., as extended storage locations within the collectively represented storage unit). Alternatively, each individual chained subsystem within the grouped set 202 can be viewable to the system host 204. The system host 204 can identify and directly communicate with each individual subsystem in the grouping. The preceding devices, including the interfacing subsystem 212, can function as interceding devices and facilitate the visibility and the corresponding direct communication between the endpoint devices.

In obfuscating the subsequently chained devices, the interfacing subsystem 212 can provide a representative mapping for the chained devices (e.g., the memory locations in the chained subsystems 214-218). Accordingly, the system host 204 can access a continuous set of logical block addressing (LBA) corresponding to the sum of the subsystems in the grouped set 202 (e.g., subsystems 222-228) and the corresponding storage capacities. The interfacing subsystem 212 can generate the representative mapping by addressing the storage locations according to one or more predetermined schemes. For example, the interfacing subsystem 212 can utilize a redundant array of independent disks (RAID) scheme, such as for RAID0, RAID5, RAID6, etc., to generate the representative mapping. The interfacing subsystem 212 can form stripes that extend across separate subsystems and group/sequence portions of memory locations therein. Also, the interfacing subsystem 212 can aggregate the addresses across the chained subsystems.

Additionally, the interfacing subsystem 212 can further perform additional maintenance/management functions. For example, the interfacing subsystem 212 can implement a data recovery procedure for RAID or other drive failures. Moreover, the interfacing subsystem 212 can collapse or combine data locally maintained on each subsystem (e.g., logs) into global data for the grouped set 202, such as according to NVMe or other requirements applicable to the computing system 200. Details regarding the management of distributed data and related processing are described below.

In interacting with the interfacing subsystem 212, the subsequently chained subsystems can further operate according to the system requirements (e.g., NVMe). For example, at boot time, once the interfacing subsystem 212 detects a connection or an interaction with the system host 204 (e.g., PCIe configuration calls), the interfacing subsystem 212 can configure the subsequently chained subsystems 214-218 for the chained operation.

In other embodiments, the interfacing subsystem 212 can be configured to include a switch configuration for managing communications between the system host 204 and the subsequently chained subsystems. For example, the memory drives in the grouped set 202 can pass PCIe enumeration requests for additional devices to downstream devices until there are no more devices and it has also enumerated itself. Upon start of initialization, the interfacing subsystem 212 can detect an active connection to the system host 204 and subsequently send initialization traffic to the next chained drive. The chained drives can also pass the initialization traffic until a drive detects than its down-stream port is unconnected. Such drive (e.g., the third chained subsystem 218) can identify itself as that last chained subsystem and enumerate itself accordingly. The upstream drives (e.g., the second chained subsystem 216 and then the first chained subsystem 214) can sequentially get enumerated until the interfacing subsystem 212 is also enumerated as an endpoint on the switch that it's presenting to the system host 204. Once the drives in the grouped set 202 are enumerated as end points on the switch, the system host 204 can be logically connected to all the drives in the grouped set 202.

Alternatively or additionally, the grouped set 202 can include the connections 224-228 having lanes that are effectively dedicated to one of the chained subsystems 214-218. For example, multiple PCIe lanes can be driven from the system host 204 to the interfacing subsystem 212. The interfacing subsystem 212 can use a smaller sub-set of lanes and the remaining lanes can be physically re-driven or re-timed to the subsequently connected chained subsystems 214-218. The individual drives in the grouped set 202 can be visible to the system host 204 directly, and the individual drives can be configured as end-points. In some embodiments, the upstream devices that receive communications to/from downstream devices can retransmit the received message in the continuing direction. The retransmission can be performed using dedicated lanes.

In some embodiments, one or more of the subsystems can locally include a management circuit 230. The management circuit 230 can include processors, logic, signal drivers, and/or other circuit components in line with local memory arrays. For example, the management circuit 230 can include the CSP or similar ASIC with PCIe and storage redundancy functionalities. The CSP can correspond to a Computational Storage Architecture that performs Computational Storage Functions (CSF) coupled to or at the storage devices (e.g., the grouped set 202), thereby offloading host processing and/or reducing data movement between the host 204 and the storage devices. Accordingly, the grouped set 202 can include, such as at the interfacing subsystem 212 and/or at the chained subsystems 214-218, a Computational Storage Engine (CSE) implemented as a hardware and/or a software component configured to execute one or more of the CSFs (e.g., compression, encryption, erasure coding, and the like). The CSP can correspond to the hardware component of the CSE and implement the CSE for an associated storage system (e.g., for corresponding subsystem and/or the grouped set 202) without providing persistent data storage at the CSP. According to the Architecture, the grouped set 202 can include a Computational Storage Drive (CSD) configured as a storage element that contains one or more CSE and persistent data storage. In other words, the CSP and the CSD can provide the hardware and software components of the CSE. Moreover, the CSD can correspond to the memory arrays within each of the drives as further described below.

As illustrated in FIG. 2, the interfacing subsystem 212 can include the CSP directly connected to/between the system host 204 and the chained subsystems 214-218. When data is written to the group set 202 represented in the CSP, the CSP can calculates the required parity and/or perform other computations and then drive the resulting data as appropriate to the subsequently chained drives. The CSP can manage the subsequently chained drives with internal enumeration as independent devices and perform internal management of the drives. The CSP for the interfacing subsystem 212 can be configured to rebuild data stored in failed drives by writing reconstructed data to a spare drive in the chain. Moreover, the CSP can be configured to manage snapshots, clones, or the like. Accordingly, using the CSP, the interfacing subsystem 212 can obviate the need for the switch 112 of FIG. 1B or a separate drive/head controller.

In some embodiments, the computational functionality (e.g., the CSF, the CSE, and/or the CSP) can be performed at a designated drive, such as the interfacing subsystem 212 or a designated drive in the chained subsystems. The computational instructions can be executed and performed in the designated drive on both the locally stored data and the data stored on other chained drives. When the computation is performed on the locally stored data, the designated drive can read the data from the memory array. When the computation is performed on the data stored on other chained drives, the designated drive can initiate commands to read the data needed from the chained drives through the internal connections 224, 226, and/or 228. The designated drive can similarly write to the local and chained memory locations.

In other embodiments, each of the subsystems in the grouped set 202 can function as a CSD and have capabilities to perform the computations/CSFs. For example, each of the NVMe drives can perform the computations locally. The designated drive can have the ability to control the distribution of the computations across the chained drives, thereby controlling what computation will be performed by which drive. The designated drive may distribute an equal amount, a majority, or an entirety of the computations to other chained drives. Additionally or alternatively, the designated drive can distribute the functions dynamically according to a remaining storage capacity, a current processing load/capacity, or the like at each of the drives.

In some conditions, the host 204 can provide instructions to the designated drive to specify the location/assignment of the data and the computation functions. The designated drive can initiate automatic computation functions without the direct control of the host, such as for the RAID calculations that may be initiated on each chained CSD on the data locally stored at each CSD. The designated drive can further send commands as directed by the host 204 for local computations and for computations in other chained drives.

Additionally as illustrated in FIG. 2, the chained subsystems can include local CSPs and/or drivers. The CSP can be configured to identify the corresponding local subsystem as a chained device (i.e., downstream from the interfacing subsystem 212) and interact with the CSP of the interfacing subsystem 212 to perform the management functions. For example, CSPs local to the chained drives can identify and report array failures to the interfacing subsystem 212. Also, regardless of the local array status, the CSPs and/or the drivers can be configured to maintain support of the serial communication within the grouped set 202, such as by continuing to receive and relay communications intended for other devices.

FIG. 3 is a block diagram of a memory system 300 in accordance with an embodiment of the present technology, coupled to a host device (e.g., the system host 204 of FIG. 2). The memory system 300 can represent the components or subsystems (e.g. NVMe drives) in the grouped set 202 of FIG. 2. Using the example illustrated in FIG. 2, the memory system 300 can represent one or more of the interfacing subsystem 212, the first chained subsystem 214, the second chained subsystem 216, and the third chained subsystem 218.

The memory system 300 can include circuitry configured to store data (via, e.g., write operations) and provide access to stored data (via, e.g., read operations). For example, the memory system 300 can include a persistent or non-volatile data storage system, such as a NAND-based Flash drive system, a Solid-State Drive (SSD) system, a NVMe drive, a SD card, or the like. In some embodiments, the memory system 300 can include a communication interface 312 (e.g., buffers, transmitters, receivers, and/or the like) configured to facilitate communications with the system host 204. For example, the communication interface 312 can be configured to support one or more host interconnect schemes, such as Universal Serial Bus (USB), Peripheral Component Interconnect (PCI), PCI Express (PCIe), Serial AT Attachment (SATA), or the like. The communication interface 312 can receive commands, addresses, data (e.g., write data), and/or other information from the system host 204.

The communication interface 312 can be configured to communicate data (e.g., read data) and/or other information to the system host 204, other chained subsystems (e.g., other subsystem(s) in the grouped set 202), or a combination thereof. For example, the communication interface 312 can include a first interface 318 and a second interface 320 (e.g., connectors, ports, communication processors, corresponding firmware/software, or a combination thereof). In some embodiments, the first interface 312 can be configured for upstream communications, and the second interface 320 can be configured for downstream communications. For the example illustrated in FIG. 2, the interfacing subsystem 212 can have the first interface connected to the system host 204 through the host-memory connection 222 of FIG. 2 and the second interface connected to the first chained subsystem 214 through the first memory-internal connection 224, of FIG. 2. The first chained subsystem 214 can have the first interface therein connected to the first memory-internal connection 224 and the second interface connected to the second memory-internal connection 226 of FIG. 2 and the second chained subsystem 216. The second chained subsystem 216 can have the first interface similarly connected to the first chained subsystem 214 and the second interface connected to the third chained subsystem 218. The last device in the grouped subset 202, such as the third chained subsystem 218, can have the first interface connected to the immediately preceding upstream device (e.g., the second chained subsystem 216) and the second interface unconnected (e.g., left open or having a dedicated plug or similar termination).

The memory system 300 can further include a memory controller 314 and a memory array 316. The memory array 316 can include memory cells that are configured to store a unit of information. The memory controller 314 can be configured to control the overall operation of the memory system 300, including the operations of the memory array 316.

In some embodiments, the memory array 316 can include a set of NAND Flash devices or packages. Each of the packages can include a set of memory cells that each store data in a charge storage structure. The memory cells can include, for example, floating gate, charge trap, phase change, ferroelectric, magnetoresistive, and/or other suitable storage elements configured to store data persistently or semi-persistently. The memory cells can be one-transistor memory cells that can be programmed to a target state to represent information. For instance, electric charge can be placed on, or removed from, the charge storage structure (e.g., the charge trap or the floating gate) of the memory cell to program the cell to a particular data state. The stored charge on the charge storage structure of the memory cell can indicate a Vt of the cell. For example, a SLC can be programmed to a targeted one of two different data states, which can be represented by the binary units 1 or 0. Also, some flash memory cells can be programmed to a targeted one of more than two data states. MLCs may be programmed to any one of four data states (e.g., represented by the binary 00, 01, 10, 11) to store two bits of data. Similarly, TLCs may be programmed to one of eight (i.e., $2^3$) data states to store three bits of data, and QLCs may be programmed to one of 16 (i.e., $2^4$) data states to store four bits of data.

Such memory cells may be arranged in rows (e.g., each corresponding to a word line) and columns (e.g., each corresponding to a bit line). The arrangements can further correspond to different groupings for the memory cells. For example, each word line can correspond to one or more memory pages. Also, the memory array 316 can include memory blocks that each include a set of memory pages. In operation, the data can be written or otherwise programmed (e.g., erased) with regards to the various memory regions of the memory array 316, such as by writing to groups of pages and/or memory blocks. In NAND-based memory, a write operation often includes programming the memory cells in selected memory pages with specific data values (e.g., a string of data bits having a value of either logic 0 or logic 1). An erase operation is similar to a write operation, except that the erase operation re-programs an entire memory block or multiple memory blocks to the same data state (e.g., logic 0).

While the memory array 316 is described with respect to the memory cells, it is understood that the memory array 316 can include other components (not shown). For example, the memory array 316 can also include other circuit components, such as multiplexers, decoders, buffers, read/write drivers, address registers, data out/data in registers, etc., for accessing and/or programming (e.g., writing) the data and for other functionalities.

As described above, the memory controller 314 can be configured to control the operations of the memory array 316. The memory controller 314 can include a processor 322, such as a microcontroller, special purpose logic circuitry (e.g., a field programmable gate array (FPGA), an application specific integrated circuit (ASIC), etc.), or other suitable processor. The processor 322 can execute instructions encoded in hardware, firmware, and/or software (e.g., instructions stored in controller-embedded memory 324 to execute various processes, logic flows, and routines for controlling operation of the memory system 300 and/or the memory array 316. The processor 322 can include the management circuit 230 of FIG. 2, such as the CSP, described above. The processor 322 and the chain interface 312 can be configured to provide the driver functionalities described above.

Further, the memory controller 314 can further include an array controller 328 that controls or oversees detailed or targeted aspects of operating the memory array 316. For example, the array controller 328 can provide a communication interface between the processor 322 and the memory array 316 (e.g., the components therein). The array controller 328 can function as a multiplexer/demultiplexer, such as for handling transport of data along serial connection to flash devices in the memory array 316.

The memory controller 314, logic circuits within the memory array 316, the management circuit 230 (e.g., the CSP), the corresponding firmware, or a combination thereof can implement a chaining control mechanism 350 configured to control and manage the connected devices. The chaining control mechanism 350 can be implemented using circuitry (e.g., dedicated logic, processor, or the like), software, firmware, or a combination thereof.

The chaining control mechanism 350 can include a position identifier 352 configured to identify a position of one or more devices included in the grouped subset 202. As an illustrative example, each of the subsystems in the grouped set 202 can implement the position identifier 352 to determine a number of devices preceding or following itself. The subsystems can implement the position identifier 352 following a power-on reset, an initiation command (e.g., a PCIe enumeration request), or a similar trigger. Each of the subsystems can determine and store an identified position 354 for itself as a result of implementing the position identifier 352.

As an illustrative example, in some embodiments, the interfacing subsystem 212 can identify itself based on receiving the PCIe enumeration request from the system host 204 through its first interface 318. In response to receiving the PCIe enumeration request and/or in response to a different trigger, the interfacing subsystem 212 can implement its local position identifier by generating and sending a predetermined internal position identification command through its second interface. The generated internal command can be received at the next subsequently chained subsystem through its first interface. In response, the receiving/chained subsystem can determine whether its second interface is connected or terminated. When the second interface is connected, the subsequently chained subsystem can identify itself as an intermediate subsystem and retransmit/relay the internal command through its second interface. When the second interface is unconnected or terminated accordingly, the receiving subsystem can identify itself as the last/terminal device in the grouped set 202 and store the corresponding value as the identified position 354. The terminal subsystem can generate a reply that includes its identifier (e.g., a device identifier, a lane identifier, the identified position, or the like), its storage capacity, or the like. When the return transmission is received through the second interface, the intermediate subsystem can read the identifier(s) therein to determine its identified position. Afterwards, each intermediate subsystem can append its identifier, capacity, etc. to the received response and retransmit the appended result through its first interface. Accordingly, the chained subsystems can identify themselves to the interfacing subsystem 212.

When the appended result reaches the interfacing subsystem 212, the chained control mechanism therein can map the memory regions (via, e.g., a traffic controller 360) according to the number devices in the grouped set 202. During the initialization, the traffic controller 360 of the interfacing subsystem 212 can generate a memory map 354 that ties logical addresses to available memory locations across the chained subsystems. Accordingly, the memory map 354 can provide access through the interfacing subsystem 212 to the system host 104 to available memory locations in each of the chained subsystems. For example, the memory map 354 can be generated according to a predetermined scheme (e.g., a RAID configuration, based on appending locations/addresses, etc. as described above). In one or more embodiments, the interfacing subsystem 212 can generate or update memory map 354 by computing memory stripes that each correspond to one set of data and extend across two or more drives according to RAID 0 configuration.

For embodiments with the grouped subset 202 and/or the interfacing subsystem 212 configured to operate as a singular storage unit (e.g., one PCIe endpoint device), the interfacing subsystem 212 can provide a PCIe enumeration response that identifies itself as a representation for the singular unit. The interfacing subsystem 212 can use the identifiers and/or the capacities to generate the memory map 354, thereby effectively presenting the subsequently chained devices to the system host 204 via logical memory mapping instead of individual PCIe endpoints. For other embodiments with the subsystems in the grouped set 202 configured to operate as individual PCIe endpoints, the interfacing subsystem 212 can provide separate PCIe endpoint responses for itself and for each of the subsystems according to the received internal responses. Additionally, the interfacing subsystem 212 can further report itself as a switch. Accordingly, the grouped set 202 can present to the system host 204 the configuration 100b of FIG. 1B without actually including the switch 112 of FIG. 1B.

After initialization and during operation, the grouped subset 202 and the traffic controller 360 therein can route the communicated data to appropriate endpoints (e.g., the system host 204 and one of the subsystems containing the targeted data location). For example, the CSP can be configured to analyze received communications to determine whether the corresponding memory operations target local storage locations. When the targeted location (e.g., address) is outside of the local storage locations, the CSP and the interface 312 can retransmit the received message according to the communication direction (through, e.g., the PCIe connector different from the receiving PCIe connector).

When the memory operation is performed locally, the performing subsystem can send a corresponding response (e.g., the read response/data, operation acknowledgement, completion status, or the like) through its first interface. Any intermediate or preceding device can receive the response through its second interface and retransmit the received response through its first interface. The interfacing subsystem 212 can similarly receive the response from downstream chained subsystem through its second interface 320 and then retransmit through the first interface 318 to the system host 204.

In addition to the normal or commanded memory operations, the grouped set 202 can manage and coordinate internal operations that involve multiple subsystems. In some embodiments, the grouped set 202 can utilize the chained controller mechanism 350 (e.g., the processor 322 and/or the management circuit 230) to coordinate storage of multiple bodies of data or corresponding memory blocks across multiple subsystems. The grouped set 202 or one or more drives therein can dynamically derive the storage locations for the multiple bodies of data or the corresponding memory blocks according to a predetermined mechanism or scheme that separates ownership of different internal operations across multiple subsystems. For example, the interfacing subsystem 212 and/or one or more chained subsystems 214-218 can store the ECC block for related or sequenced bodies of data across different drives. Accordingly, when the related bodies of data are accessed, the corresponding drives can simultaneously perform the ECC operations in parallel instead of one device sequentially performing the ECC operations for the grouped bodies of data. Also, for example, the grouped set 202 can coordinate the data storage locations and the subsequent read operations for performing subcomponents of a complex data manipulation (e.g., facial recognition) at multiple drives in parallel.

In some embodiments, the grouped set 202 can allocate the data targeted for storage according to a striping mechanism. For example, the grouped set 202 can store the first data on the first drive, the second data on the second drive, and so forth following a circular pattern. Accordingly, one or more of the drives (e.g., at the interfacing subsystem 212) can use a mathematical operation to determine a storage location of a received data. Additionally, the grouped set 202 can add a rotating parity to provide embedded level of protection. In other embodiments, the grouped set 202 can use a controlled replication under scalable hash (CRUSH) mechanism or other similar mechanisms to allocate the received data.

The grouped set 202 can leverage the distributed processing capacity (via, e.g., the CSPs) and the distributed data to perform parallel operations for a larger task. As an illustrative example, the grouped set 202 can perform parallel operations for facial recognition. By partitioning the data by groups on each drive, the grouped set 202 can determine the subgroupings of the data for the overall facial recognition task. In other words, each drive can store thereon a subset of the images, and each search may be conducted locally by each drive on the locally stored subset. Accordingly, the drives can simultaneously or in parallel search for a match against locally stored subset of images. The drive having the match can return a matching result. Alternatively, each of the drives can return a set of results that have confidence values exceeding a minimum threshold. A designated drive (e.g., the interfacing subsystem) can rank the returned results according to the confidence values to determine a final result of the larger task. Thus, the grouped set 202 can provide parallel data processing that reduces the complexity and execution speed of a larger task. Moreover, the overall traffic between the host and the memory system can be reduced by retaining the computations and the related communications internal to the memory system.

The grouped set 202 can further leverage the distributed processing capacity and the distributed data for other complex functions. For example, a larger set of data can be stored using multiple drives, and each drive can perform the Erasure Coding Computations (ECCs) can be for the locally stored data. Alternatively for the ECC, the drive having the ECC data can perform the ECC function, thereby freeing up the CSPs in other drives to perform other functions during the ECC. Also, the grouped set 202 can perform deduplication and any sort of local data manipulation (e.g., snapshot or replication). Likewise, the grouped set 202 can be configured to divide or assign the processing load across the multiple CSPs according to the nature/size of the data and the task.

In managing the unit of data or related data as distributed across the individual subsystems, the grouped set 202 can implement failure management and data remapping functions. For example, the individual drives can be configured to report or respond to a command for identifying errors such as drive failures. Alternatively, one or more drives in the grouped set 202 can detect a failure of another chained drive based on a change in voltage related to the other chained drive, a failure to receive a status from the other chained drive, or other similar mechanisms. Upon detecting the failure, the remaining drives can leverage ECC functionalities to recover the portions of the data stored on the failed drive. If the recover is successful, the regenerated data can be stored at a new location/drive and mapped accordingly.

Such recovery operation can be performed in parallel instead of at a single node/drive. As a comparative example, a conventional NVMe drive having a RAID 5 storage configuration across 8 drives handles a failure at a head controller. The conventional scheme will require the head controller to rebuild the data for every access, thus requiring reads from the seven surviving drives and then performing XOR across the returned data. In contrast, for the grouped set 202, the drive containing the stripe parity can perform the reconstruction (e.g., XOR) for data in that stripe. Accordingly, each of the remaining seven drives can be engaged in rebuilding data from its own stripes, thereby distributing the workload of the conventional head controller across the seven drives within the grouped set 202 to increase processing speed and prevent overloading one drive.

Figure 4:
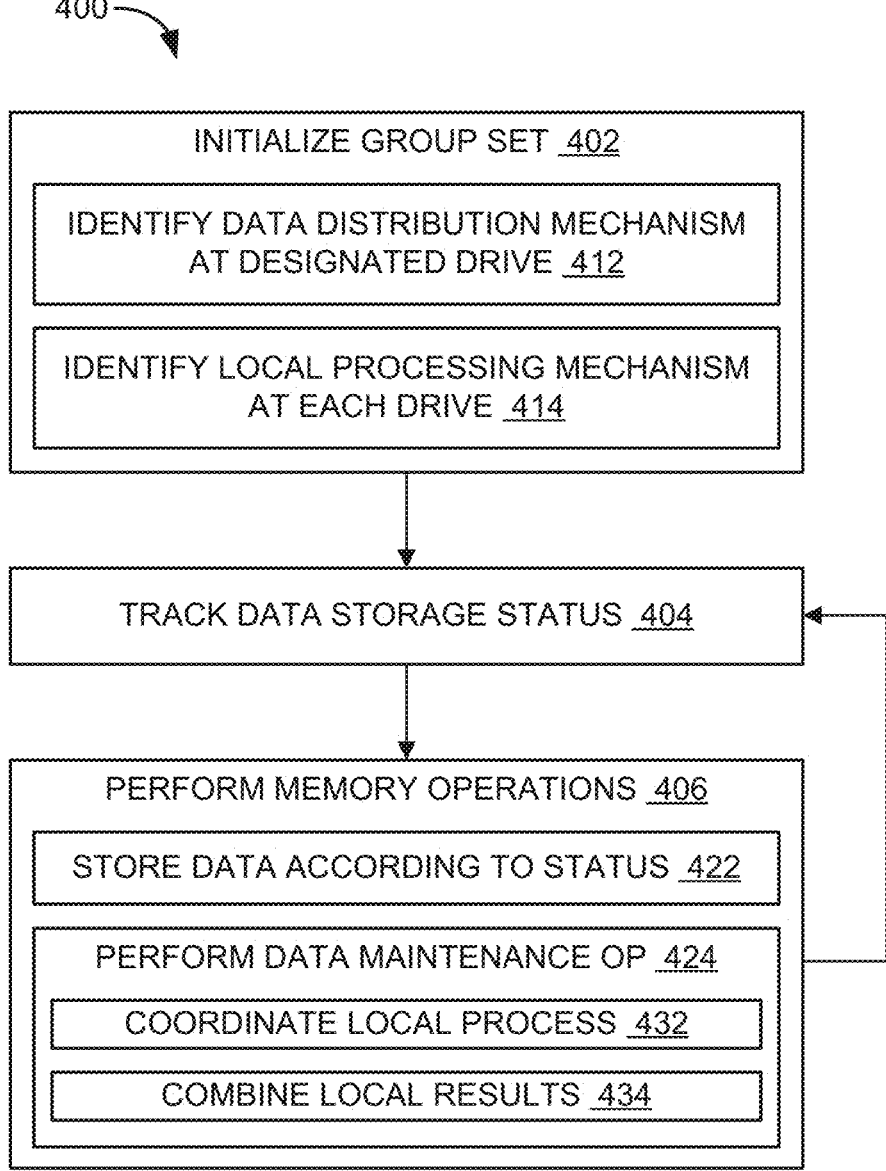
FIG. 4 is a flow diagram illustrating an example method of operating an apparatus in accordance with an embodiment of the present technology.

FIG. 4 is a flow diagram illustrating an example method 400 of operating an apparatus in accordance with an embodiment of the present technology. For example, the method 400 can be for operating a set of serially chained subsystems or drives, such as described above for the computing system 200 of FIG. 2, the grouped set 202 of FIG. 2 or one or more components therein (e.g., the interfacing subsystem 212 of FIG. 2, one or more of the chained subsystems 214-218 of FIG. 2, and/or the memory system 300 of FIG. 3). The method 400 can be for managing distribution of related unit or group of data and associated data processing across the chained subsystems.

At block 402, the grouped set 202 can initialize the drives therein to function as a serially connected unit of storage drives. In initializing, the host 204 of FIG. 2, the grouped set 202 (e.g., the interfacing subsystem 212), or both can identify a data distribution mechanism at one or more designated drives. The data distribution mechanism can include a rule, a software, a predetermined circuit, or the like that determines how targeted types of data can be distributed across the drives. Using the facial recognition example described above for illustrative purposes, the host 204 and/or the grouped set 202 can determine that a predetermined number of images can be stored at each drive, and subsequent images can be stored at the next drive according to a RAID striping mechanism or a CRUSH mechanism.

Also in initializing, the grouped set 202 can identify a local processing mechanism at or for each drive therein. The local processing mechanism can include the functions, the rules, the software, the logic, and the like that identifies which drive performs what functions with respect to the locally stored portion of the overall data and/or the aggregate of the locally processed data for the overall data. For example, the grouped set 202 can identify the functions, the algorithm, and the scope of the functions designated to be performed by each drive. Also, the grouped set 202 can identify the mechanism and/or the designated drive (e.g., the interfacing subsystem) for initiating such functions at the individual drives and for combining the results. Some examples of the local processing mechanisms can be for maintaining the log for the entirety of the grouped set 202, coordinating parallel processing for specific types of data, ECC, drive failure recovery, and the like as described above.

At block 404, the grouped set 202 can track the storage status according to the data distribution mechanism. The grouped set 202 can use one or more of the drives to identify the drive last used to store a targeted type of data and/or the drive designated to store the next targeted type of data. For example, the grouped set 202 can identify where the data stripes begin and end according to the RAID or the CRUSH mechanisms as the host 204 writes to the grouped set 202.

At block 406, the grouped set 202 can perform memory operations, such as reads, writes, log updates, data/drive recovery, parallel operations, etc. For example, at block 422, the grouped set 202 can store a unit or a grouping of a targeted type of data across the chained drives. The grouped set 202 can store the write data according to the data distribution mechanism and the tracked storage status. Also, at block 424, the grouped set 202 can use one or more of the CSPs to locally process the stored data at one or more of the drives and/or combine the locally processed data. For such coordinated processing, one or more of the chained drives (e.g., the designated drive, such as the interfacing drive) can coordinate, command, or initiate local data processing at one or more of the other chained drives as shown at block 432. The designated drive can respond to a host command and send corresponding internal commands to one or more drives according to the predetermined processing mechanism. In response, each of the internally commanded drives can perform the commanded process according to the internal processing mechanism. For some operations, the commanded drives can return the internal processing results to the designated drive. At block 434, the designated drive can combine the processing results and/or forward the results to the host 204.

As an illustrative example, in performing the facial recognition function, the interfacing subsystem can command the other drives to match the provided image to locally stored images. Each of the drives can perform the comparisons according to a predetermined algorithm and return one or more locally stored images that correspond to a satisfactory confidence level (e.g., as defined by a predetermined match threshold). The interfacing subsystem can combine the internal results and report the combined result back to the host. As an illustrative example of the logging function, the interfacing subsystem can maintain a storage log for the grouped set 202 according to the tracked storage status and the internal status communications from the chained drives (e.g., error reports, capacity reports, and other similar internal information). As an illustrative example of the drive recovery function, all of the drives can be configured to respond to a failure of one drive by generating the lost message (via, e.g., XOR) with locally stored information. The designated drive (e.g., the interfacing subsystem or a next drive as predetermined for a potential interfacing subsystem failure) can combine the locally recovered results according to the tracked status and determine a new storage location for the recovered data.

Figure 5:
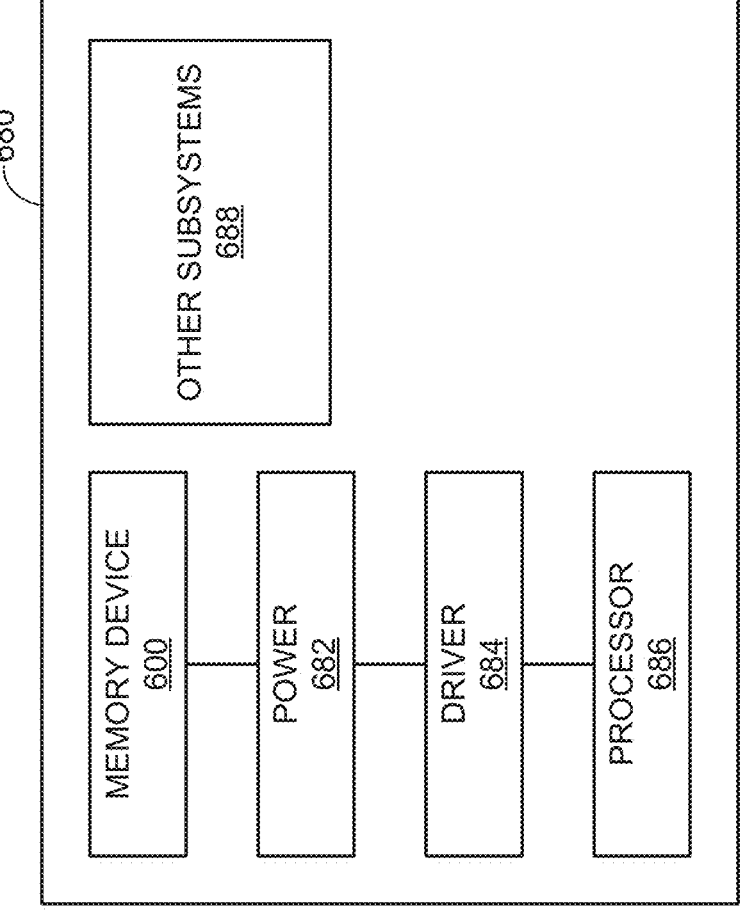
FIG. 5 is a schematic view of a system that includes an apparatus in accordance with an embodiment of the present technology.

FIG. 5 is a schematic view of a system that includes an apparatus in accordance with embodiments of the present technology. Any one of the foregoing apparatuses (e.g., memory devices) described above with reference to FIGS. 2-4 can be incorporated into any of a myriad of larger and/or more complex systems, a representative example of which is system 580 shown schematically in FIG. 5. The system 580 can include a memory device 500, a power source 582, a driver 584, a processor 586, and/or other subsystems or components 588. The memory device 500 can include features generally similar to those of the apparatus described above with reference to FIGS. 2-4, and can therefore include various features for performing a direct read request from a host device. The resulting system 580 can perform any of a wide variety of functions, such as memory storage, data processing, and/or other suitable functions. Accordingly, representative systems 580 can include, without limitation, hand-held devices (e.g., mobile phones, tablets, digital readers, and digital audio players), computers, vehicles, appliances and other products. Components of the system 580 may be housed in a single unit or distributed over multiple, interconnected units (e.g., through a communications network). The components of the system 580 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the apparatuses have been described in the context of DRAM devices. Apparatuses configured in accordance with other embodiments of the present technology, however, can include other types of suitable storage media in addition to or in lieu of DRAM devices, such as, devices incorporating NAND-based or NOR-based non-volatile storage media (e.g., NAND flash), magnetic storage media, phase-change storage media, ferroelectric storage media, etc.

The term "processing" as used herein includes manipulating signals and data, such as writing or programming, reading, erasing, refreshing, adjusting or changing values, calculating results, executing instructions, assembling, transferring, and/or manipulating data structures. The term data structure includes information arranged as bits, words or code-words, blocks, files, input data, system-generated data, such as calculated or generated data, and program data. Further, the term "dynamic" as used herein describes processes, functions, actions or implementation occurring during operation, usage or deployment of a corresponding device, system or embodiment, and after or while running manufacturer's or third-party firmware. The dynamically occurring processes, functions, actions or implementations can occur after or subsequent to design, manufacture, and initial testing, setup or configuration.

The above embodiments are described in sufficient detail to enable those skilled in the art to make and use the embodiments. A person skilled in the relevant art, however, will understand that the technology may have additional embodiments and that the technology may be practiced without several of the details of the embodiments described above with reference to FIGS. 2-5.

We claim:

1. A memory system, comprising:
a chained memory subsystem including a chained memory array for locally storing first data at the chained memory subsystem; and
an interfacing subsystem (1) separate from and serially connected to the chained memory subsystem and (2) including an interfacing local array for locally storing separate second data at the interfacing subsystem, wherein the chained memory subsystem, the interfacing subsystem, or both locally include a computational storage processor (CSP) configured to locally perform a Computational Storage Function (CSF) on one of the first and the second data that is locally stored at a corresponding one of the chained subsystem and the interfacing subsystem to generate a processed result at the chained memory subsystem, the interfacing subsystem, or both.

2. The memory system of claim 1, wherein the CSP is configured to have the chained memory subsystem and the interfacing subsystem perform independent or coordinated processing in parallel.

3. The memory system of claim 1, wherein the chained memory subsystem and the interfacing subsystem are configured to store different portions of a unit of data.

4. The memory system of claim 3, wherein:

the unit of data includes an Error Correction Computation (ECC) code; and the CSP for one of the chained memory subsystem and the interfacing subsystem is configured to:

identify that the ECC code for the unit of data is locally stored in the one of the chained memory subsystem; and in response to identifying that the ECC code is stored locally in the one of the chained memory subsystem, (1) gather the unit of data that includes the ECC code and (2) perform an ECC function on the gathered unit of data, wherein the ECC function is performed independent of a remaining one of the chained memory subsystem and the interfacing subsystem.

5. The memory system of claim 4, further comprising:

a second chained subsystem serially connected to the chained memory subsystem, the second chained memory subsystem including a second chained local array for locally storing third data, wherein the chained memory subsystem is a first chained subsystem, wherein the first chained subsystem, the second chained subsystem, and the interfacing subsystem are each configured to detect a failure in other chained subsystems, and wherein, in response to detecting the failure, the first chained subsystem, the second chained subsystem, and the interfacing subsystem are each configured to (1) identify that the ECC code that is locally stored corresponds to the unit of data having a lost portion stored in a failed subsystem, (2) gather remaining portions of the unit of data, and (3) locally perform a recovery function to recompute the lost portion or the unit of data using the ECC code.

6. The memory system of claim 5, further comprising:

at the interfacing subsystem, receiving a search command and a search target from a system host; and communicating an internal command and the search target to the chained memory system, wherein a local result includes an indication that the search target is stored at a responding one of the chained memory subsystem and the interfacing subsystem.

7. The memory system of claim 3, wherein each of the chained memory subsystem and the interfacing subsystem is configured to:

locally store a portion of the unit of data; and in parallel, operate on the locally stored portion to generate a local result, wherein one of the chained memory subsystem and the interfacing subsystem is configured to:

receive a separate result generated by another of the chained memory subsystem and the interfacing subsystem; and combine the local result with the separate result to generate a combined result.

8. The memory system of claim 7, wherein:

the unit of data includes an Error Correction Computation (ECC) code; and the one of the chained memory subsystem and the interfacing subsystem that receives the separate result and generates the combined result is the subsystem having the ECC code locally stored thereon.

9. The memory system of claim 7, wherein the interfacing subsystem is configured to:

receive a read command from a system host for the unit of data;

communicate an internal command to the chained memory subsystem for implementing the read command;

obtain the combined result by receiving the combined result from the chained memory subsystem or generating the combined result at the interfacing subsystem; and send the combined result to the system host as a response to the read command.

10. The memory system of claim 1, wherein the chained memory subsystem and the interfacing subsystem are each Non-Volatile Memory Express (NVMe) drive that are connected in series using Peripheral Component Interconnect Express (PCie) connections.

11. The memory system of claim 1, wherein the interfacing subsystem is configured to generate a memory map that continuously combines storage locations of the chained memory array and the interfacing local array for representing the storage locations as belonging to a single drive.

12. The memory system of claim 11, wherein the memory map includes stripes that each extend across the chained memory array and the interfacing local array.

13. The memory system of claim 11, wherein the memory map corresponds to a redundant array of independent disks (RAID) storage mapping.

14. A Non-Volatile Memory Express (NVMe) drive, comprising:

a local array for storing data;

a logic circuit configured to selectively operate the NVMe drive as either (1) an interfacing drive configured to be disposed between a system host and a chained drive and to facilitate access to data stored on the chained drive or (2) the chained drive configured to provide access to the local array through an upstream drive;

a computational storage processor (CSP) configured to locally perform a Computational Storage Function (CSF) on data stored on another chained device;

an upstream interface configured to communicatively couple the NVMe drive to an upstream device, wherein the upstream device is (1) a system host when the NVMe drive is operating as the interfacing drive or (2) the upstream drive when the NVMe drive is operating as the chained drive; and a downstream interface configured to communicatively couple the NVMe drive to the chained drive when the NVMe drive is operating as the interfacing drive.

15. The NVMe drive of claim 14, wherein the logic circuit, the CSP, or a combination thereof is configured to:

access, from an array local to the NVMe drive, a local portion of a unit of data;

obtain one or more external portions of the unit of data from one or more external drives through the upstream interface, the downstream interface, or both;

combine the local portion and the one or more external portions to generate the unit of data at the NVMe drive; and communicate the unit of data through the upstream interface, the downstream interface, or both.

16. The NVMe drive of claim 15, wherein the logic circuit, the CSP, or a combination thereof is configured to:

determine that the local portion includes an Error Correction Computation (ECC) code for the unit of data; and generate the unit of data at the NVMe drive based on implementing an ECC function to validate the unit of data or correct errors in the combination of the local portion and the one or more external portions.

17. A method of operating a Non-Volatile Memory Express (NVMe) drive, the method comprising:

identifying a position for the NVMe drive within a chain of serially connected memory drives, wherein the position is identified based on a load connected to a communication interface, a message received through the communication interface, or a combination thereof;

accessing, from an array local to the NVMe drive, a local portion of a unit of data;

obtaining one or more external portions of the unit of data from at least one drive external to the NVMe drive; and combining the local and external portions of the unit of data based on implementing a Computational Storage Function (CSF) on the local and/or external portions using a computational storage processor (CSP) local to the NVMe drive.

18. The method of claim 17, further comprising:

determining that the local portion includes an Error Correction Computation (ECC) code for the unit of data, wherein:

the one or more external portions of the unit of data are obtained in response to the determination that the local portion includes the ECC code; and combining the local and external portions includes implementing an ECC function on a combination of the local and external portions.

19. The method of claim 18, further comprising:

receiving a read command for an address associated with the unit of data, wherein:

combining the local and external portions includes generating a read response that includes the unit of data combined from the local and external portions.

20. The method of claim 18, wherein the ECC function is implemented in parallel to accessing another data portion from the local array, communicating the another data portion to an upstream device or a downstream device, relaying information received from one of the upstream device and the downstream device to other of the upstream device and the downstream device, or a combination thereof.

* * * * *